United States Patent [19]

Höhn et al.

[11] 4,371,879

[45] Feb. 1, 1983

[54] METALIZED RECORDING CARRIER FOR RECORDING INSTRUMENTS, AND METHOD OF ITS MANUFACTURE

[75] Inventors: Richard Höhn, Stuttgart; Werner Jung, Waiblingen; Gerhard Winter, Remshalden; Siegfried Woerner, Stuttgart, all of Fed. Rep. of Germany

[73] Assignee: Robert Bosch, GmbH, Stuttgart, Fed. Rep. of Germany

[21] Appl. No.: 261,611

[22] Filed: May 7, 1981

[30] Foreign Application Priority Data

May 7, 1980 [DE] Fed. Rep. of Germany ....... 3017450

[51] Int. Cl.[3] ............................................ G01D 15/24

[52] U.S. Cl. .................................................. 346/135.1

[58] Field of Search .......................... 346/135.1, 76 L

[56] References Cited

U.S. PATENT DOCUMENTS 3,514,325 5/1970 Davis et al. ...................... 346/135.1

3,891,787 6/1975 Ueyama ....................... 346/135.1 X 4,054,094 10/1977 Caddell et al. ............... 346/76 L X 4,101,907 7/1978 Bell et al. ...................... 346/76 L X

*Primary Examiner*—Donald A. Griffin

*Attorney, Agent, or Firm*—Frishauf, Holtz, Goodman & Woodward

[57] ABSTRACT

To prevent the formation of scratches, surface discontinuities, slide tracks or striations, for example due to sliding of electrodes (20) over the metal layer (12) of a metalized recording medium, a protective surface coating (13) of low-friction sliding protective material is applied in the form of discontinuous islands over the metal layer (12). The discontinuities permit electrical contact between the electrode (20) and the metal layer (12) although the protective surface coating (13) has insulating properties. The coating (13) may be polymerized hexamethyl-disiloxane, hexafluoropropylene, or Teflon, polymerized, preferably in a hot cathode glow discharge; or a metallic soap. The protective layer is hydrophobic in the form of islands of a thickness of between $10^{-9}$m to $10^{-7}$m, preferably about 1 to $2\times10^{-8}$m, thus protecting the underlying metal layer (12) against damage by the electrode (20), and attack by moisture or dampness from the ambient atmosphere. A surface portion can be rendered hydrophilic to permit writing on the recording paper by a felt pen, with aqueous ink or the like.

19 Claims, 1 Drawing Figure

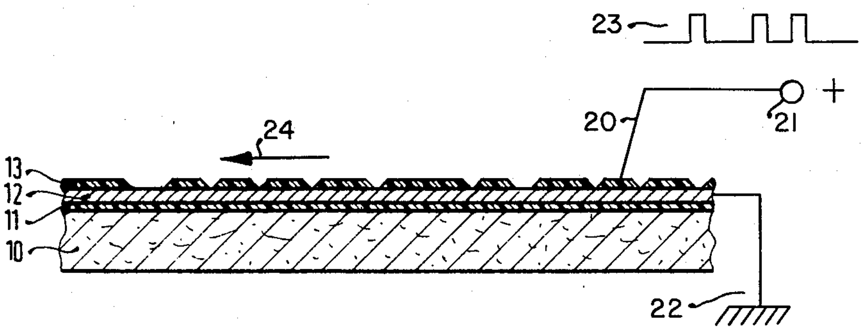
23
24
20
21
+
13
12
11
10
22

METALIZED RECORDING CARRIER FOR RECORDING INSTRUMENTS, AND METHOD OF ITS MANUFACTURE

The present invention relates to recording carriers for recording instruments, and particularly to a recording carrier in web-like form, for example of paper or plastic, which has a metallic coating which, under the influence of electrical voltage applied across an electrode, is capable of being burned off, leaving a trace at the burn-off position, and to a method of its manufacture.

BACKGROUND

Various types of recording paper based on removal of a top cover layer of a metal, typically aluminum, under influence of applied electrical signals, have been proposed.

One such recording carrier is described in German Pat. No. 1 945 939. The outer metal layer is aluminum, applied to a web-like or strip or tape-like paper carrier. The chemical integrity of the metal layer is improved if some proportion of the aluminum of the coating is converted into aluminum oxide or aluminum oxyhydrate. The permanence and stability of the coating are thereby enhanced.

Another way of enhancing the permance and stability of the recording carrier is described in Swiss Pat. No. CH-PS 301 000, in which a metal coating, not further described, is covered with a thin cover coating applied thereover. Such a thin protective cover coating can be obtained by a layer of quartz or paraffin, applied by condensation from a vapor phase. Oils as protective layers in a molecular thickness can also be applied by vapor deposition. It has also been proposed to use a lacquer coating of polystyrene as a protective coating.

It has been proposed to protect optical components such as mirrors, lenses or the like, against chemical and/or mechanical damage by providing a protective layer over the optical elements (see German Patent Disclosure Document DE-OS 22 63 480). Such a protective layer to protect the optical components or devices with respect to mechanical or chemical influences is a hydrophobic protective layer or coating applied to a substrate forming the optical element. The hydrophobic protective layer is obtained by precipitation and polymerization of polysiloxane in an electrical glow discharge. An organo-silicon compound is introduced into a vacuum vessel in the form of a vapor, and polymerized by a glow discharge on the substrate. This protective coating has the advantage of relatively high mechanical hardness and good adhesion, thus providing an improved protective coating with respect to mechanical protection of the substrate while, additionally, having a decreased coefficient of friction with respect to elements or devices sliding thereover, that is, providing for good sliding properties over the thus protected optical component.

The purpose of the protective coating, however made or constituted, is intended to increase the stability and permanence of the actual recording layer. Ideally, the metal recording layer should be protected against decomposition due to ambient humidity or moisture in the air and against abrasion due to travel of the electrodes thereover, which may leave scratches or tracks.

THE INVENTION

It is an object to provide a recording substrate, typically paper, with a metal coating capable of being burned off by an electrode sliding thereover in which the metal coating is effectively protected against mechanical and/or chemical deterioration.

Briefly, the recording medium uses a substrate carrier or base, typically made of paper, or made of a plastic or the like, with a coating thereover which is made of a metal capable of being burned off when subjected to an electrical discharge by an electrode applied over the metal. A contrasting layer may be interposed between the metal, typically aluminum, and the substrate carrier.

In accordance with the invention, a low-friction sliding surface layer is applied over the metal layer to prevent deterioration of the recording medium as well as of electrodes applied to the top layer which glide thereover.

The recording medium has the advantage that it has, compared to prior art media, an entirely different coefficient of friction with respect to electrodes sliding thereover, while also effectively protecting the metal coating against mechanical damage. The protection of the top layer is particularly important since damage of the recording carrier in the form of scratches, striations, or slide or draw tracks by the electrodes in those locations where they do not burn out the top layer are effeciently prevented. Thus, the contrast of the trace of the recording made and areas beneath the electrode which do not have a recording burn-off spot, but which are beneath the electrode and carried therealong by a paper transport, are not impaired due to the mechanical abrasion of the electrode against the metal layer. Additionally, the metal coating or layer, and hence the overall recoding medium, has a substantially longer shelf life, and aging influences due to storage and ambient atmospheric conditions are effectively inhibited.

In accordance with a feature of the invention, the layer applied to the metal coating is a hydrophobic layer, thus effectively preventing deterioration of the underlying metal by ambient atmospheric humidity or moisture. If it is desired to additionally permit manual writing or printing on the carrier, after it has been metalized and protected with a hydrophobic layer, a post-treatment with oxygen permits formation of a hydrophilic surface region in the hydrophobic protective layer. This hydrophilic surface facilitates manual application of indicia or legends by aqueous inks, with felt pens, and the like.

The hydrophobic layer can be applied in the form of vapor-deposited and polymerized hexamethyldisiloxane; metallic soaps may also be used, providing for coatings with hydrophobic characteristics.

DRAWINGS

The FIGURE shows a recording carrier with a protective layer on the surface of a metal coating, and, highly schematically, an electrode thereover capable of forming a burning visible recording trace in the recording carrier.

A web or sheet-like carrier 10, made of paper or plastic, for example a polyester such as Mylar ®, forms the substrate or carrier for the recording medium. The carrier 10 has a contrast layer 11 applied thereto in order to improve the resistance against corrosion of the entire record carrier and to provide for optical contrast between recorded and non-recorded surface areas. The contrast layer 11 may, for example, be a lacquer or an ink. A metal layer 12, typically aluminum, is applied over the contrast layer 11. The metallic layer is vacuum-deposited; rather than aluminum, it may be of zinc and/or cadmium. Scratches, slide tracks, and other damage to the surface, marring its visual continuity, are prevented by forming a sliding or low-friction layer 13 over the metal coating 12. Such scratches and sliding tracks and the like can be caused by drawing the recording carrier beneath an electrode 20 in the direction of the arrow 24. Electrode 20 of spring wire and the like is connected to a source of positive voltage 21, the metal layer 12 being connected to the negative terminal 22, shown as a ground, chassis or frame connection. Grounding can be obtained, for example, by passing a roller over the carrier, in electrical contact with the aluminum layer 12, or connecting an end portion thereof to a grounded clamp. Depending on the energization of terminal 21, as shown schematically by a pulse-like signal 23, selected areas of the metal coating 12 will be burned off as the record carrier 24 is drawn beneath the electrode in the direction of the arrow 24. In those regions where the carrier moves without a signal being applied, however, as illustrated for example by the gap in the signal 23, the electrode 20 may cause scratches or other surface imperfections in the recording surface of the carrier, thus detracting from the legibility of those areas where the metal coating 12 has been burned off. In accordance with the present invention, the sliding or low-friction layer 13 prevents damage to the metal layer 12 by providing a low-friction sliding surface for the electrode 20. The layer 13 is not continuous, but rather is a sequence of dots or islands of low-friction material. Due to the small sizes of the gaps between islands, it may visually appear continuous. It provides a sliding surface for the electrode 20 to glide thereover.

In accordance with a feature of the invention, the sliding layer 13 is made this way: A hydrophobic layer 13 is applied, preferably made of polymerized hexamethyldisiloxane (HMDS); other layers may be used, for example a layer made of a polymerized hexafluoropropylene (HPF), or polytetrafluoroethylene (PTFE), customarily known as Teflon®. The various sliding or low-friction layers can be readily applied from the vapor phase by deposition on the metallic layer 12 and polymerization in a glow discharge. Polymerization can be obtained by either a glow discharge due to high-voltage application between electrodes, or by a glow discharge using a heated emitting electrode which operates in a gas which amplifies the discharge. Use of a thermally generated glow discharge is preferred, since the operating voltages required are substantially less than when using cold-cathode discharge, and the lower operating voltage results in apparatus requiring less insulation due to the lower operating voltage in the metal vapor deposition apparatus, and thus facilitating control of the process.

For some applications it may be desirable to permit writing on the layer 13 by ink, felt pens, or the like, on the coated recording medium. To permit such writing, the surface of the layer 13 is rendered hydrophilic. This can be achieved by exposing the surface to oxygen towards the end of the polymerization process. A top surface which is inorganic and similar to quartz will then form on the protective layer. This top surface will accept aqueous ink, writing with a felt pen, or the like.

In accordance with another feature of the invention, the low-friction layer 13 is a hydrophobic metal soap layer. It has been found by experimentation that such a layer has good permanence and excellent sliding or gliding characteristics. Metal soaps normally are available in colloidal form and are applied in a separate process on a previously vapor deposited metal layer 12.

The recording medium is particularly suitable having an aluminum recording layer, using paper for the substrate 10. With respect to previously used recording carriers, it has substantially increased resistance against scratching, slide tracks, or other marring or impairment of the surface, which may occur due to the contact with the electrodes 20, or deposits which build thereon, and which interfere with the overall visibility of the recording being made. The electrodes easily slide over the recording carrier regardless of the voltage condition at terminals 21, 22, that is, regardless of whether they are energized or not. In dependence on the surface characteristics, and the quality of the surface over which the electrodes 20 slide, the surface is more or less affected by the electrodes, regardless of whether they carry current or not, and, if the surface is subject to deterioration, striations or scratches may result. Layer 13 permits easy sliding of the electrodes over the substrate.

In accordance with a feature of the invention, the low-friction or sliding layer 13 can be applied to the metal coating 12 simultaneously or in connection with an already present step in making the recording carrier. Thus, the low-friction layer 13 can be applied in the vapor depositing apparatus itself, immediately downstream, in the direction of manufacture of the metal coating, behind the vapor depositing station for the metal coating 12; this is a preferred form; alternatively, the coating 13 can be applied in a spooling station, in combination with a testing station, with a cutting station, or a packaging station. The various apparatus components are well known and are constructed in a suitable manner to permit exposure of the surface 13 to the vaporized material of the substance selected to form the layer 13, and polymerization thereof, for example by a thermally assisted glow discharge.

In a typical example, the paper layer 10 may have a thickness of between about 0.05 to 0.1 mm, over which a lacquer coating 11 of about 0.001 to 0.01 mm is applied, using carbon black as a contrast pigment. The range is not critical, and the lower thickness is preferred. The aluminum layer may be between about 0.01 and 0.1 $\mu$m, preferably between about 0.05 to 0.1 $\mu$m.

The sliding or low-friction top layer 13 may have a thickness of between about $10^{-9}$ to $10^{-7}$ m, preferably between about $10^{-8}$ m to $2\times10^{-9}$ m thickness. The above-given figures relate to average thickness. The layer 13 is not generally a continuous layer but, rather, is interrupted, that is, it has pores therebetween. The actual top or peak of the layer 13 above the underlying coating 11 may extend over the average thickness which is generally shown; the extension above the average thickness is indicated at 13' in the figure. Molecules of sliding material may well have a size which exceeds the minimum size of the average layer thickness, that is, the molecules themselves may have a size greater than $10^{-9}$ m in diameter, that is, extend to the peak of the dimension 13', as shown in the drawing. It is to be understood, of course, that the drawing is highly schematic, and the generally uniform thickness relates to the average thickness for ease of illustration. The interruptions or gaps between the molecules, or strings of molecules, or islands of molecules forming the layer 13 will also permit discharge of electric energy from the electrode 20 to the underlying metal layer 12 without having to overcome the dielectric insulation resistance of the layer 13 which, in some embodiments, may be an excellent insulator, such as Teflon, for example. A suitable operating voltage between terminals 21, 22 is between about 15–60 V.

Metallic soaps have been found to be eminently suitable as a material for the coating 13. A suitable metallic soap is, for example, aluminum metallic soap, derived from the vapor-deposited aluminum conductive layer, or mechanically applied. Sodium soap also has been found to be eminently suitable. Sodium soap may be applied from the solid phase with a layer thickness of about $10^{-8}$ m. Application from the solid phase is desirable; application from the liquid phase will lead to a closed continuous layer 13–contrary to that shown in the figure of the drawing, so that recording difficulties will arise when the recording medium is to be employed for its intended purpose. Interruption of the continuity of the layer 13 substantially facilitates the recording operation. In the drawing, electrode 20 is shown only schematically, and, of course, not to scale with respect to the layer 13 and the peaks 13′.

Although the layer 13 is not continuous, the underlying metallic layer 12 is protected against mechanical abrasion due to the presence of the electrode, so that scratches, drawn lines and tracks upon engagement of the electrode 20 with the top of the medium are effectively prevented. The layer, although not continuous, also has good protective properties with respect to ambient humidity and moisture due to the extremely small interruptions or gaps between the islands forming the layer 13. The extreme thinness of layer 13 permits electrical discharge from the electrode 20 to the metal layer 12 through the gaps between the islands of the layer 13.

Metallic soaps can be defined, for example, as a salt of a monocarboxylic acid, as a higher fatty acid, resin acid, naphthenic acid with a bivalent or trivalent metal, for example calcium, cobalt, zinc, copper, lead, aluminum, sodium, that typically is insoluble in water but soluble in benzine. Other uses for such metallic soaps are in lubricants or driers and for water-proofing.

We claim:

1. Metalized recording medium for recording instruments of the burn-out recording type upon being subjected to an electrical discharge from an electrode (20) having a contacting surface which is being passed over the surface of the medium, comprising a substrate carrier (10);

a metal layer (12) supported by the carrier and of a thickness permitting burning-off of the metal layer when positioned beneath an energized electrode (20);

and a low-friction surface layer applied over said metal layer, wherein, in accordance with the invention, the low-friction slide surface layer (13) is formed, prior to contact with an energized electrode, of discontinuous islands smaller than the contacting surface of the electrode (20) to permit easy gliding of the electrode (20) over the surface of the carrier without marring or scratching or leaving tracks on the carrier upon relative movement between the carrier and the electrode while providing for electrical connection of the electrode with said metal layer (12).

2. Recording medium according to claim 1, wherein low-friction slide the layer (13) is a hydrophobic surface layer.

3. Recording medium according to claim 2, wherein the surface layer (13) comprises polymerized hexamethyldisiloxane.

4. Recording medium according to claim 2, wherein the hydrophobic layer (13) comprises polymerized hexafluoropropylene.

5. Recording medium according to claim 2, wherein the hydrophobic low-friction slide surface layer (13) comprises polytetrafluoroethylene.

6. Recording medium according to claim 2, wherein the low-friction slide surface layer (13) has an upper surface portion which is hydrophilic.

7. Recording medium according to claim 6, wherein the hydrophilic surface portion comprises an oxygenated surface portion.

8. Recording medium according to claim 1, wherein the low-friction slide surface layer (13) comprises a layer of a metal soap.

9. Recording medium according to claim 1, wherein the substrate carrier (10) comprises at least one of the materials selected from the group consisting of: paper; plastic; and the metal layer (12) comprises a vapor-deposited metal layer comprising at least one of the materials of the group consisting of: aluminum; cadmium; zinc; and having a thickness in the order of about 0.01 to 0.1 $\mu$m.

10. Recording medium according to claim 1, wherein the low-friction slide surface layer (13) comprises a glow discharge polymerized vapor-deposited layer applied over the metal layer (12).

11. Recording medium according to claim 1, wherein the low-friction slide surface layer (13) has an average thickness of between about $10^{-9}$ to $10^{-7}$ m.

12. Recording medium according to claim 1, wherein the low-friction slide surface layer (13) has an average thickness of between about 1 to $2\times10^{-8}$ m.

13. Method of making a metalized recording medium for recording instruments of the burn-out recording type as claimed in claim 1 having a substrate carrier (10) and comprising the steps of:

introducing the carrier into a closed vessel;

vapor-depositing a metal layer (12) on the carrier of a thickness permitting burning-off of the deposited metal layer, when positioned beneath an energizing electrode;

and applying a low-friction protective slide surface layer (13) immediately behind the vapor deposition station in the form of discontinuous islands smaller than the contacting surface of the electrode within said vessel on the vapor-deposited metal layer.

14. Method according to claim 13, wherein the step of applying the low-friction slide surface layer comprises depositing a polymerizable material from the vapor phase on the metal layer;

and exposing the vapor-deposited protective layer to a glow discharge to polymerize said protected low-friction slide surface layer (13).

15. Method of making a metalized recording medium for recording instruments of the burn-out recording type as claimed in claim 1 having a substrate carrier (10) and comprising the steps of:

introducing the carrier into a closed vessel;

vapor-depositing a metal layer (12) on the carrier of a thickness permitting burning-off of the deposited metal layer, when positioned beneath an energizing electrode;

spooling and testing said metal layer at a spooling and testing station;

and applying a low-friction protective slide surface layer (13) in the form of discontinuous islands smaller than the contacting surface of the electrode at said spooling and testing station.

16. Method of making a metalized recording medium for recording instruments of the burn-out recording type as claimed in claim 1 having a substrate carrier (10) and comprising the steps of:

introducing the carrier into a closed vessel;

vapor-depositing a metal layer (12) on the carrier of a thickness permitting burning-off of the deposited metal layer, when positioned beneath an energizing electrode;

cutting the carrier to a predetermined format at a cutting station;

and applying a low-friction protective slide surface layer (13) in the form of discontinuous islands smaller than the contacting surface of the electrode at said cutting station.

17. Recording medium according to claim 1, wherein the material of the low-friction slide surface layer (13) is electrically insulating.

18. Recording medium according to claim 1, wherein said low-friction slide surface layer (13) is formed with pores to provide for gaps or interruptions between said islands.

19. Recording medium according to claim 1, wherein said islands are formed by strings or islands of molecules of the material of said low-friction slide surface layer.

* * * * *